Patented Apr. 7, 1942

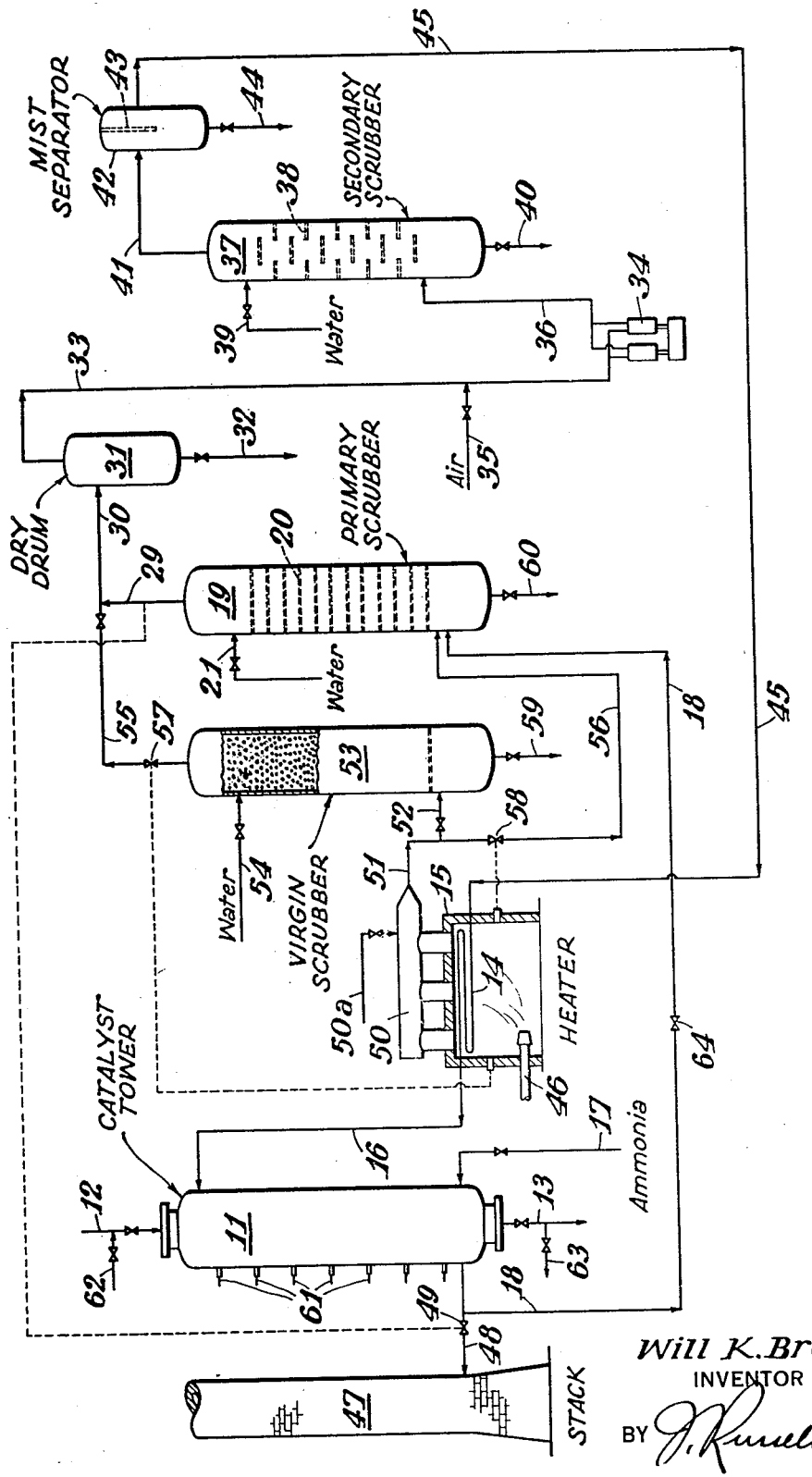

2,278,509

UNITED STATES PATENT OFFICE 2,278,509

CATALYST REGENERATION

Will K. Brown, Chicago, Ill., assignor to Standard Oil Company, Chicago, Ill., a corporation of Indiana Application June 30, 1938, Serial No. 216,700

12 Claims. (Cl. 252—242)

This invention relates to means and methods for revivifying catalysts. More particularly it relates to systems wherein a catalyst is revivified by means of a hot gas containing controlled amounts of oxygen coupled with the recycling of the gas used in the revivification step.

In the catalytic treatment of hydrocarbons such as the polymerization or alkylation of hydrocarbon gases, the dehydrogenation of hydrocarbons, the cracking of hydrocarbons or the isomerization of hydrocarbons, solid catalysts may be used to effect these reactions. Many types of catalysts are used, for example, the so-called solid phosphoric acid catalyst (phosphoric acid absorbed on a support such as clay), metallic salts of inorganic acids such as cadmium pyrophosphate, metallic oxides of metals such as aluminum and chromium oxides, clays, aluminum silicate, and clays or silica impregnated or coated with any of the above and related compounds. During the course of these catalytic reactions, for example, polymerization of olefins to form motor fuels or the dehydrogenation of paraffinic gases to form olefins, or the cracking of hydrocarbon oils, a coke-like material is laid down on the surface of the solid catalyst. In order to revivify the catalyst, this layer of coke or coke-like material must be burned off without destroying the catalyst itself. In using a hot flue gas containing controlled amounts of air or oxygen for the revivification of used catalysts, it is highly desirable that this used gas be recycled in order to reduce the heat load on the furnace supplying the flue gas, lower the cost of the revivification operation, and control the burning on the catalyst surface.

It is an object of my invention to provide improved means and methods for revivifying used solid catalytic materials. More particularly it is an object of my invention to provide means and methods whereby a revivification gas can be recycled with controlled amounts of oxygen in order to effect the burning of the coke-like material on the surface of the catalyst mass without destroying or impairing the effectiveness of the catalyst.

A specific embodiment of my invention will be described with reference to the accompanying drawing which forms a part of this specification and is to be read in conjunction with it.

Referring to the drawing in more detail, catalyst tower 11 is provided with a valved inlet 12 for the reacting hydrocarbon materials and a valved outlet 13 for the reacted materials. Catalyst tower 11 may, for instance, contain solid phosphoric acid and the material entering through inlet 12 may be olefin-containing gases. Alternatively the catalyst chamber 11 may contain any type of solid catalyst material such as clay or silica impregnated with metallic oxides and salts. In actual practice a plurality of towers arranged in multiple are commonly used so that one or more can be cut out for revivification without interrupting the process. Since my invention is concerned solely with the revivification, a single tower is shown and the rest of the polymerization system, familiar to the art is omitted. The flue gases or inert gases for revivification are heated in coil 14 of the preheater 15 and passed through line 16 to the top part of the catalyst tower 11. Ammonia may be introduced into the bottom of the catalyst chamber 11 through valved conduit 17 to neutralize the acid constituents that may be swept along with the flue gases leaving this chamber. The revivification gas passes through the tower and is withdrawn from the lower part of the catalyst tower through line 18 and forced to the bottom part of the primary scrubber 19. This scrubber is equipped with baffles or plates 20 which aid in effecting intimate contact between the gases and scrubbing medium. The scrubbing cools the gases, which is desirable before compression, and removes any entrained material contained in these gases. The gases pass up through the primary scrubber, countercurrent to the scrubbing medium, which is introduced into the top thereof through valved conduit 21. Water is preferably used as the scrubbing medium.

The scrubbed gases pass from the top of the primary scrubber through conduits 29 and 30 to the dry drum 31 in which entrained water is separated. This water is removed periodically through the valved drain 32. From the top of the dry drum the gases pass through line 33 to the compressor 34. Controlled amounts of oxygen or air are introduced into line 33 through valved conduit 35 in order to control the rate of burning in the catalyst chamber. If desired, the valved conduit 35 may be placed in line 45. From the compressor the gases pass through conduit 36 to the bottom part of the secondary scrubber 37, the principal purpose of which is to further cool the gases and precipitate additional entrained water—an excess of water usually being harmful to some catalysts in the revivification step. In the case of solid phosphoric catalysts, for example, the water content of the gases passed to the catalyst chamber should not exceed about 4 to 5% by volume of water vapor, This scrubber is provided with the usual contact plates or baffle plates 38. The scrubbing medium, water, is introduced into the top part of the secondary scrubber through valved conduit 39, is withdrawn from the bottom of the tower through valve conduit 40. The secondary scrubber may be eliminated if the water content of the compressed gases is not objectionable in the revivification step. The scrubbed gases pass from the top of tower 37 through conduit 41 to the mist separator 42. A baffle 43 is provided in the mist separator to assist in removing entrained particles of water. Periodically the condensate in separator 42 is withdrawn through valved conduit 44. The scrubbed gases are then passed through conduit 45 to coil 14 of the preheater 15, thus completing the cycling operation.

Preheater 15 is preferably of the pressure type and operates on fuel gas and air introduced through burner 46. The hot flue gas is not only used to heat the gases in coil 14, but it is collected and used to supply make-up gas to the system. This make-up gas, together with air added through inlet 35, replaces the small amount of gas continuously passed to stack 47 through conduit 48 with the aid of back pressure regulator valve 49. In a preferred operation, about 15–20% of the total revivification gas passing through tower 11 goes to the stack 47. Otherwise stated, about 80–85% of the gas is recycled. It will be understood, however, that any desired amount of recycling can be used, for instance 25 to 95%.

The make-up flue gas generated in furnace 15 passes to the enlarged manifold 50 which is mounted on top of the furnace. By introducing water through line 50—A at this point, the flue gas is quenched to a temperature of approximately 800° F. and thence passes through conduit 51 and valved conduit 52 to the bottom of virgin scrubber 53, the main function of which is to cool the gases and precipitate water. The make-up flue gas in tower 53 is scrubbed countercurrently by a spray of water which is introduced into the top of the tower through valved conduit 54. Suitable baffles or perforated plates or packing may be placed in the tower 53 to effect the desired contact between the ascending gas and scrubbing medium.

Controlled amounts of the make-up flue gas are passed from the top of tower 53 through valved conduit 55 and joined with the gases in conduit 29. If desired, the make-up flue gas in line 51 may be by-passed around tower 53 and passed by valved conduit 56 to the lower part of tower 19 and scrubbed along with the recycle gases introduced therein through conduit 18. The means and method for controlling the flow of gases through line 55 or 56 will be described hereinafter. The pressure maintained within the combustion chamber of the preheater, forces the make-up flue gas through the virgin scrubber 53 or the primary scrubber 19. Usually, the virgin scrubber is not used except when the pressure drop through the primary scrubber is very high—due to the presence of filters or excessive packing or baffle plates in the primary scrubber. When the pressure drop through the primary scrubber is high (10 to 30 lbs. per sq. in.) it is apparent that the recycled gases in line 18 should be slightly above this pressure so that they will pass up through the tower and leave the tower at a pressure slightly below the pressure in line 55. Under the above mentioned conditions, it is apparent that the make-up flue gases, generated at a pressure usually below 8 lbs. per square inch, could not enter the bottom part of the primary scrubber, and consequently they are first scrubbed in the virgin scrubber 53 where the pressure drop is relatively low so that they will enter line 55 at a pressure equal to or slightly above the pressure of the gases in line 29. If, however, the recycled gases in line 18 are below the pressure of the make-up flue gases, it is apparent that the make-up flue gases can also be introduced into the bottom of the primary scrubber along with the recycled gases.

It is preferred to control the pressure in preheater 15 and the passage of gas to the stack in accordance with pressures in the system. Thus back pressure regulator 49 is controlled, as shown by the dotted line, by means responsive to and in accordance with the pressure in the line 29. As the pressure in line 29 increases above the particular pressure chosen for use in the tower 19, gas is passed by valve 49 to the stack and conversely as the pressure in line 29 decreases, the flow of gases through valve 49 is throttled down. Similarly, back pressure regulator 57 is controlled by the pressure existing within the combustion chamber of preheater 15. The fuel gas introduced into the combustion chamber of the heater 15 is burned under pressure, usually from 1 to 4 lbs. per square inch, and when the pressure in the combustion chamber increases above the particular pressure chosen for operation, more make up flue gas is admitted to the system through valve 57 and conversely if the pressure in the combustion chamber falls below the predetermined pressure, valve 57 throttles down the flow of fresh make up gas to the system. If the virgin scrubber 53 is cut out of the system, as hereinbefore described, then a back pressure regulator 58 is placed in line 56. Back pressure regulator 58 is controlled, as shown by the dotted line, by means responsive to and in accordance with the pressure within the combustion chamber of the heater— this operation being similar to the operation of the back pressure regulator 57. By using this automatic control system, the desired pressure within the regeneration process can be easily maintained.

The water or scrubbing medium withdrawn from the bottom of tower 53 through valved conduit 59 and the scrubbing medium withdrawn from the bottom of tower 19 through valved conduit 60 may be cooled and recycled or disposed of in any suitable manner.

The following example will illustrate one method for using my invention to revivify spent catalyst. A hydrocarbon gas, containing controlled amounts of air or oxygen, is introduced through the burner 46 into the combustion chamber or heater 15 and burned therein. This combustion is effected under pressures slightly above atmospheric pressure but usually below about 8 lbs. per square inch. It is preferred to maintain a pressure from about 1 to 4 lbs. per square inch in the combustion chamber so that these hot gases will pass through the virgin scrubber or primary scrubber. In general, the pressure maintained in the combustion chamber of the heater 15 should be slightly above the pressure drop through the scrubber. The hot combustion gases are water quenched and passed through conduits 51 and 56 to the bottom of the primary scrubber 19 where they are scrubbed and cooled by the water introduced in line 21. These gases are then passed to the dry drum 31 where entrained particles of water are removed and the gases are then compressed and passed to the secondary scrubber 37 where they are again scrubbed and cooled with water in order to reduce their water content.

These cooled and partially dried gases pass to the mist separator 42 and thence to the heating coils 14 of the heater 15. Here they are brought up to a temperature of about 550° F. These hot gases then pass through conduit 16 to the top part of the catalyst chamber 11 and pass down through the chamber in contact with the spent catalyst. These gases then leave the lower part of the catalyst tower through line 18 and are recycled to the bottom of the primary scrubber 19. By continuing this cycle, the spent catalyst in the chamber 11 will gradually be brought up to a temperature of about 500 to 550° F. and the oxygen content of these gases, controlled by the amount of air or oxygen used in the combustion of the gases in the combustion chamber of heater 15, should not exceed about ¼% of oxygen. This procedure will permit the catalyst in tower 11 to heat up without appreciable combustion of the carbonaceous material on the surface of the catalyst and at the same time distill off the volatile and oily deposits on the catalyst surface.

By raising the temperature of the gases leaving the coil 14, the temperature of the catalyst bed can be raised gradually but very little combustion will take place within the catalyst chamber until the oxygen content of the revivification gases is increased. It is apparent from this mode of operation that the catalyst within the chamber 11 may be brought to any desired temperature, for example 400 to 760° F. before enough air or oxygen is added to the flue gases to effect combustion of the carbonaceous material laid down on the catalyst surface. By gradually adding air or oxygen through valved conduit 35, the oxygen content of the hot gases entering the catalyst tower 16 will be increased and the carbonaceous material on the catalyst surface will ignite and burn. The spent catalyst near the top of the tower 11 will ignite first and this burning will gradually continue down through the entire bed of the catalyst. This burning can be followed by the temperature recorded with the aid of the thermocouples 61 which are placed at spaced intervals along the side of the catalyst tower. During the burning operation in the catalyst tower, the temperature of the gases leaving the lower part of the tower through conduit 18 should not be permitted to fall below about 600° F. and the maximum temperature within the catalyst chamber should not be permitted to exceed about 900 to 950° F. and it is preferred to maintain a temperature from 830 to 900° F. When the oxygen content of the gases leaving the bottom of the catalyst tower through conduit 18 rises to about 16%, it is safe to assume that the catalyst has been revivified and substantially all of the carbonaceous material on the surface of the catalyst burned off. By regulating the flow of air through valved conduit 35, the rate of burning in catalyst chamber can be easily controlled. With a tower of about 32 ft. heighth and 8 ft. in diameter, filled with spent catalyst, it will require from four to five days to regenerate the catalyst when flue gas is circulated at the rate of about 150,000 cu. ft. per hour. In general, the gases in the coil 14 should not be heated to the temperature that is used in the catalyst chamber to revivify the catalyst because the combustion of the carbonaceous material on the surface of the porous catalyst-mass will raise the temperature within the catalyst chamber. These conditions will vary somewhat with the particular catalytic material to be revivified. In the case of solid phosphoric acid catalysts, the gases in the coil 14 should be heated to a temperature within the range of about 500 to 600° F. and during the burning of the carbonaceous material on the catalyst surface within the tower 11, the temperature will rise several hundred degrees, that is, within the range of 800 to 950° F.

In carrying out the above operation, from 15 to 20% of the used gas should be vented to the stack 47 and this may be accomplished automatically by the back pressure valve 49 which operates by means responsive to and in accordance with the pressure in line 29. In other words, this valve may be set so that it will bleed a portion of the used gas into line 48 in response to the pressure in line 29. Also, additional make-up flue gas may be sent to the system in response to the pressure in line 56 with the aid of the back pressure regulator 58 which is controlled by means responsive to and in accordance with the pressure in the combustion chamber of the furnace 15. This same result is accomplished by the back pressure valve 57 when the virgin scrubber is used to cool and quench the make-up gas before it enters conduit 30.

The extent to which gases are compressed by compressor 34 will depend primarily upon the method of operating the primary scrubber 19 and the pressure drop during the passage of these gases through the coils 14 and catalyst chamber 11. In many cases the pressure drop through the coil 14 and catalyst chamber 11 will be within the general range of 15 to 30 lbs. per sq. in. and consequently the gases in line 45 should be maintained slightly above this pressure so that when the gases are recycled through line 18 to the bottom of the primary scrubber 19 they will be under sufficient pressure to overcome the pressure drop through the scrubber. If the pressure of the recycle gases is below the pressure of the make-up gases, then the latter may be passed to the bottom part of the primary scrubber and the virgin scrubber cut out of the system. If, however, the recycle gases in line 18 are above the pressure of the make-up gases, the latter are scrubbed in the virgin scrubber 53, where the pressure drop is slight, and then introduced into the recycle gas through valved conduit 55.

Small amounts of ammonia may be added to the bottom of the catalyst chamber 11 through valved conduit 17 to neutralize any acidic material that may be removed from the surface of the catalyst by the hot combustion gases.

It is necessary to hydrate the catalyst after revivification. Usually this is accomplished by passing steam previously superheated in furnace 15, through valved conduit 62 into the top part of the tower 11 and withdrawing it from the bottom part of the tower through conduit 63. Also a superheated steam purge before revivification will remove a large part of the volatile and oily material on the catalyst surface.

It is apparent from the foregoing example that my invention provides a very flexible and highly efficient process for revivifying spent catalyst. While the foregoing example has been set forth with reference to specific temperatures, it is apparent that these may be adjusted to suit the particular catalyst being revivified. When revivifying solid phosphoric acid catalyst, the hot flue gases with controlled amounts of air should be introduced to revivify the catalyst and burn off the deposit of carbon on the catalyst surface. This burning is usually effected at temperatures ranging from 800 to 925° F. After the carbonaceous material has been removed from the surface of the catalyst, it should then be rehydrated with superheated steam at a temperature within the range of 400 to 600° F.

Attempts have been made to revivify catalysts with the aid of hot flue gases but such processes have proven to be practically ineffective and highly uneconomical. In particular, these prior attempts to revivify spent catalysts with hot flue gases have failed because of inadequate means to control the rate of combustion of the carbonaceous material contained on the surface of the catalyst. Also such processes have proven to be uneconomical because of the large amount of hot flue gases required to reactivate the catalyst. By my process, the rate of combustion of the carbonaceous material can be controlled very easily, in fact, catalysts may even be heated to temperatures of 600° F. without any burning of the carbonaceous material and the degree of burning can be easily controlled by the amount of air or oxygen introduced through valved conduit 35. Likewise, by recirculating the used flue gas, as hereinbefore described, relatively little fresh feed gas need be added to the system during the four or five day revivification process.

As previously indicated, I prefer to recycle a large part of the gas which has been used to revivify the catalyst. However, a large part of the advantages of my invention are retained if valve 64 in line 18 is closed and all of the gases from the catalyst tower 11 are passed to stack 47. This operation, like the preferred one has the advantage that much of the heat generated in making the original flue gas is used to reheat the cooled and scrubbed flue gas in coil 14 before it is passed to the catalyst tower.

While I have described my invention with reference to specific examples, certain pressure and temperature conditions, and preferred embodiments, it is apparent that my invention is not limited thereby and should be construed as broadly as the prior art will permit.

I claim:

1. In the process of revivifying a solid catalyst-mass which becomes impaired by contact with excessive amounts of steam at high temperatures and upon which is deposited a coke-like material, the steps comprising passing therethrough a hot flue gas containing controlled amounts of oxygen to burn off the coke-like material and revivify the catalyst, scrubbing the used flue gas with a cool scrubbing medium to remove excessive amounts of water vapor therefrom, compressing the scrubbed flue gas, heating the compressed flue gas and returning it with controlled amounts of oxygen to the revivification step.

2. In the process of revivifying a solid catalyst-mass upon which is deposited a coke-like material, the steps comprising passing therethrough a hot flue gas containing controlled amounts of oxygen to burn off the coke-like material and revivify the catalyst, scrubbing the used flue gas with water, compressing the scrubbed flue gas, again scrubbing the compressed flue gas with water, heating the compressed and scrubbed flue gas and returning it with controlled amounts of oxygen to the revivification step.

3. In the process of revivifying a solid catalyst-like mass upon which is deposited a coke-like material, the steps comprising passing therethrough a hot flue gas containing controlled amounts of oxygen at a temperature sufficient to burn off the coke-like material, scrubbing the used flue gas, compressing the scrubbed flue gas, scrubbing the compressed flue gas, heating the compressed and scrubbed flue gas to a temperature of about 600° F. and returning it with controlled amounts of oxygen to the revivification step.

4. In the process of revivifying a solid catalyst-mass which becomes impaired by contact with excessive amounts of steam at high temperatures and upon which is deposited a coke-like material, the steps comprising passing therethrough a hot flue gas containing controlled amounts of oxygen at a temperature within the range of 800 to 950° F. to burn off the coke-like material and revivify the catalyst, scrubbing the used flue gas with a cool scrubbing medium to remove excessive amounts of water vapor therefrom, compressing the scrubbed flue gas, heating the compressed flue gas to a temperature within the range of 400 to 600° F. and returning it with controlled amounts of oxygen to the revivification step.

5. In the process of revivifying a solid catalyst-mass which becomes impaired by contact with excessive amounts of steam at high temperatures and upon which is deposited a carbonaceous material, the steps comprising passing therethrough a hot flue gas containing controlled amounts of oxygen to burn off the carbonaceous material, scrubbing the used flue gas with water, adding controlled amounts of air to the thus scrubbed flue gas to remove excessive amounts of water vapor therefrom, compressing the mixture of flue gas and air, scrubbing the mixture of flue gas and air with water, heating the compressed admixture of flue gas and air to a temperature within the range of 400 to 600° F., and returning it to the revivification step.

6. In the process of revivifying a solid catalyst-mass upon which is deposited a carbonaceous material, the steps comprising passing therethrough a hot flue gas containing controlled amounts of oxygen to burn off the carbonaceous material, scrubbing the used flue gas with water, adding controlled amounts of air to the thus scrubbed flue gas, compressing the mixture of flue gas and air, scrubbing the mixture of flue gas and air with water, heating the compressed admixture of flue gas and air to a temperature sufficiently high to initiate combustion and returning it to the revivification step.

7. In the process of revivifying a solid catalyst-mass upon which is deposited a carbonaceous material, the steps comprising passing therethrough hot flue gas containing controlled amounts of oxygen to burn off the carbonaceous material and revivify the catalyst, scrubbing a substantial proportion of the used flue gas with a cool scrubbing medium to remove excessive amounts of water vapor therefrom and venting the remainder from the system, compressing the scrubbed flue gas, heating the compressed flue gas and returning it with controlled amounts of oxygen to the revivification step, burning hydrocarbon gas and passing it in heat exchange relation with said compressed flue gas to effect the heating thereof and adding controlled amounts of the combustion products of the hydrocarbon gas to the recycle flue gas.

8. In the process of revivifying a solid catalyst-mass which becomes impaired by contact with excessive amounts of steam at high temperatures and upon which is deposited a carbonaceous material, the steps comprising generating hot flue gas, scrubbing said flue gas to cool said flue gas and precipitate water, compressing the scrubbed flue gas which has been freed from precipitated water, reheating the scrubbed flue gas by indirect heat exchange in the flue gas generating zone and passing said reheated flue gas through said catalyst-mass together with controlled amounts of oxygen to revivify said catalyst-mass.

9. In the process of revivifying a solid catalyst-mass upon which is deposited a carbonaceous material, the steps comprising generating hot flue gas, scrubbing said flue gas to cool said flue gas and precipitate water, compressing the scrubbed flue gas which has been freed from precipitated water, reheating the scrubbed flue gas by indirect heat exchange in the flue gas generating zone, passing said reheated flue gas through said catalyst-mass together with controlled amounts of oxygen to revivify said catalyst-mass, and passing at least a substantial portion of the flue gas which has passed through said catalyst-mass back to said scrubbing step for recirculation within the system.

10. In the process of revivifying a solid catalyst-mass comprising acidic constituents upon which is deposited a carbonaceous material, the steps comprising passing therethrough a hot flue gas containing controlled amounts of oxygen to burn off the carbonaceous material, scrubbing the used flue gas with water, adding controlled amounts of air to the thus scrubbed flue gas, compressing the mixture of flue gas and air, scrubbing the mixture of flue gas and air with water, heating the compressed admixture of flue gas and air to a temperature within the range of 400 to 600° F. and returning it to the revivification step.

11. In the process of revivifying a solid catalyst-mass comprising phosphoric acid upon which is deposited a carbonaceous material, the steps comprising passing therethrough a hot flue gas containing controlled amounts of oxygen to burn off the carbonaceous material, scrubbing the used flue gas with water, adding controlled amounts of air to the thus scrubbed flue gas, compressing the mixture of flue gas and air, scrubbing the mixture of flue gas and air with water, heating the compressed admixture of flue gas and air to a temperature within the range of 400 to 600° F. and returning it to the revivification step.

12. The process of claim 1 which includes the step of maintaining a pressure on the gas in the zone of the catalyst undergoing revivification of at least 10 pounds per square inch above atmospheric throughout said zone and throughout the revivification step.

WILL K. BROWN.

CERTIFICATE OF CORRECTION.

Patent No. 2,278,509. April 7, 1942.

WILL K. BROWN.

It is hereby certified that error appears in the printed specification of the above numbered patent requiring correction as follows: Page 4, second column, lines 24, 25 and 26, claim 5, strike out the words "which becomes impaired by contact with excessive amounts of steam at high temperatures and" and insert the same before "upon" in line 54, claim 7; and that the said Letters Patent should be read with this correction therein that the same may conform to the record of the case in the Patent Office.

Signed and sealed this 26th day of May, A. D. 1942.

(Seal)

Henry Van Arsdale,
Acting Commissioner of Patents